United States Patent [19]
Leadford

[11] Patent Number: 5,954,091
[45] Date of Patent: Sep. 21, 1999

[54] RETAINING STRUCTURE FOR A FUEL TANK MOUNTED VALVE BODY

[75] Inventor: Gary H. Leadford, Canton, Mich.

[73] Assignee: G.T. Products, Inc., Ann Arbor, Mich.

[21] Appl. No.: 08/902,838

[22] Filed: Jul. 30, 1997

[51] Int. Cl.$^6$ .................................................. F16K 17/36
[52] U.S. Cl. ........................... 137/587; 137/43; 251/144; 251/367
[58] Field of Search ................................... 137/587, 590, 137/43, 15; 251/144, 366, 367

[56] References Cited

U.S. PATENT DOCUMENTS

| | | | |
|---|---|---|---|
| 4,779,637 | 10/1988 | Ubaldi | 137/43 |
| 5,139,043 | 8/1992 | Hyde et al. | 137/43 |
| 5,404,907 | 4/1995 | Benjey et al. | 137/43 |

Primary Examiner—A. Michael Chambers
Attorney, Agent, or Firm—Young & Basile, P.C.

[57] ABSTRACT

In a two piece valve assembly comprising a non-weldable lower valve body portion inserted into the fuel tank through an opening in the tank wall, and an upper valve body portion or cover made from a weldable material and designed to be connected to the lower valve body portion and welded to the upper surface of the fuel tank wall, an improved assembly structure comprising a plurality of circumferentially-spaced support/retention tabs formed on the upper end of the lower valve body portion to provide a self-supporting option for the lower valve body so that it may rest with the tabs on the upper surface of the fuel tank when inserted into the fuel tank opening, and/or further to be securely sandwiched between the upper valve body/cover and the upper surface of the fuel tank wall when a weldable portion of the cover is welded to the tank and melts over the tabs, thereby strengthening the connection between the upper and lower valve body portions. In a preferred form the tabs interact with a plurality of downwardly-extending lock fingers on the upper valve body to help rotationally align and secure the lower valve body with the upper valve body when they are assembled.

15 Claims, 3 Drawing Sheets

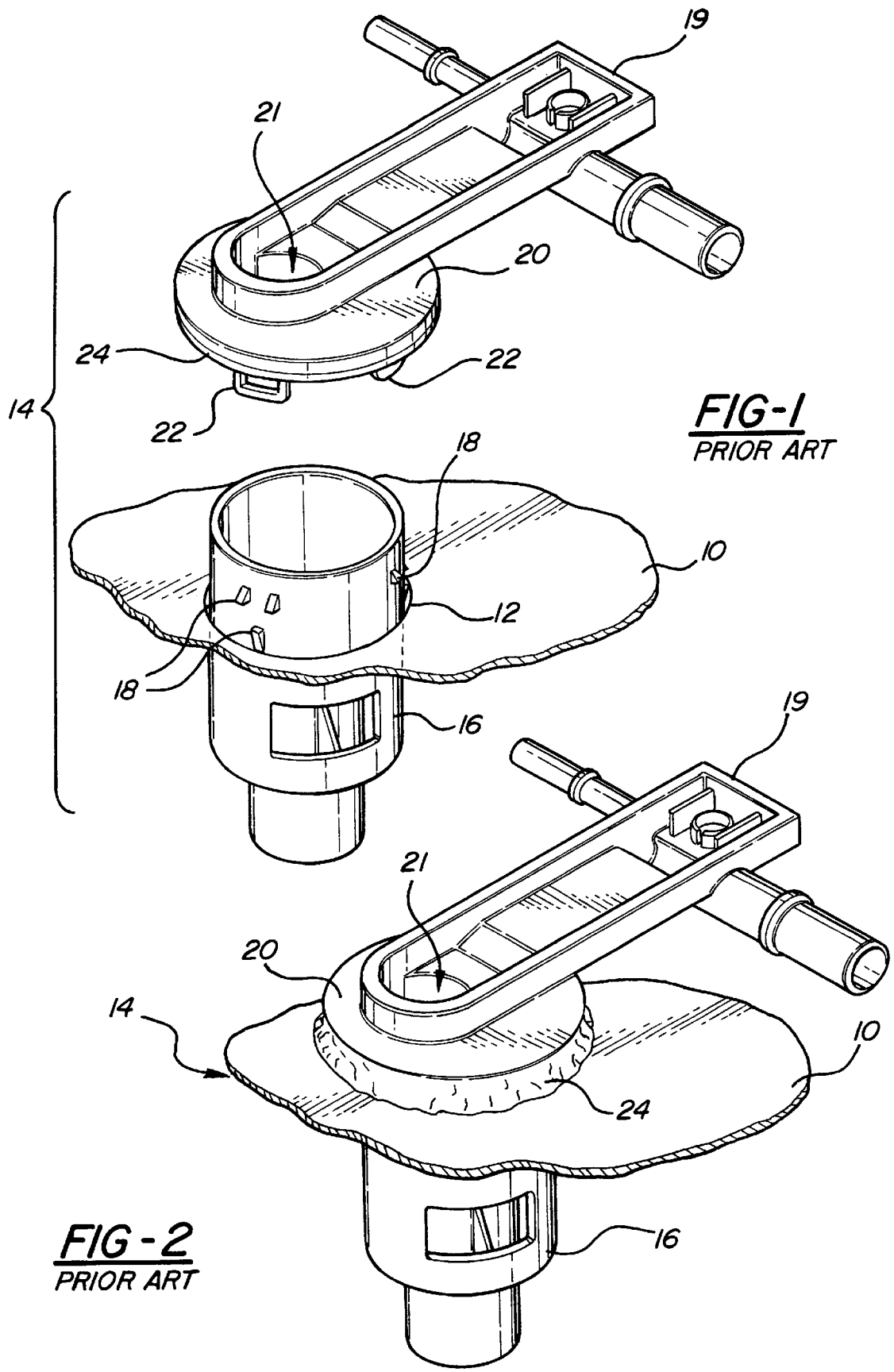

RETAINING STRUCTURE FOR A FUEL TANK MOUNTED VALVE BODY

FIELD OF THE INVENTION

The present invention is generally in the field of vent valves mounted to automotive fuel tanks, and more particularly relates to structure for securely positioning and retaining such valves in the mounting holes through which they are inserted into the fuel tank.

BACKGROUND OF THE INVENTION

Automotive fuel tanks are typically supplied with one or more vapor venting valves of different type to selectively vent fuel vapor from the interior of the fuel tank. Commonly used valves include "ORVR" (onboard refueling/vapor recovery) control valves and rollover valves. Fuel tank mounted vapor vent valves typically have a hollow valve body which is inserted through an opening formed in the tank such that a lower part of the valve body is located in the tank, and an upper part or cover of the valve body remains outside the tank. In many cases the lower and upper portions of the valve body are formed separately and are connected mechanically or by known methods such as ultrasonic welding, heat staking or overmolding. The lower portion of the valve body is sized to fit through the opening in the fuel tank, while the upper portion of the valve body is wider to keep the valve assembly from falling through the fuel tank opening.

A common method for securing the valve assembly to the tank is to provide a weldable connector portion on the upper valve body made from a weldable material similar to the material of the fuel tank wall. When the valve assembly is inserted through the fuel tank opening, the weldable connector rests on the upper surface of the fuel tank and is welded to the fuel tank wall to secure the valve in place. Examples of valves with weldable connectors are shown in co-owned U.S. Pat. No. 5,404,907,137/587 issued May 11, 1995.

Mechanical connection of the non-weldable and weldable portions of the valve is often preferred, due to its simplicity and low costs. But while the weld between the weldable upper portion of the valve body and the fuel tank wall is highly reliable, the mechanical connection with the lower valve body is often subject to thermal expansion and creep under fuel tank operating conditions, which can loosen the connection between the lower valve body and the upper valve body or cover, destroying the integrity of the mounting arrangement and of seals between the upper and lower portions. The present invention is directed to overcoming this problem.

SUMMARY OF THE INVENTION

The present invention overcomes the difficulties experienced with the mechanical connection between a lower valve body portion inserted through the opening in the tank and the upper portion or cover of the valve body which rests on top of and is welded to the fuel tank. This is generally achieved by providing means on the lower valve body portion which rests on the upper surface of the fuel tank and which interacts with the weldable upper valve body portion such that the welding operation secures both the upper and lower valve portions to the fuel tank wall.

In an embodiment of the invention illustrated in detail below, the retention means on the lower valve body comprises a plurality of laterally projecting retaining tabs extending from the upper end of the lower valve body to rest on the upper surface of the fuel tank around the fuel tank opening and within the periphery of the weldable portion of the upper valve body or cover. The retaining tabs make the lower valve body self-supporting on the fuel tank when it is inserted through the fuel tank opening. When the upper valve body or cover is subsequently welded to the upper surface of the fuel tank around the opening, the retaining tabs are firmly sandwiched between the cover's weld "foot" (which melts during welding) and the surface of the tank.

The invention eliminates the need for a pre-assembled mechanical interlock between the lower valve body and the upper valve body. However, in a further embodiment of the invention, the lower valve body is provided with conventional mechanical interlock structure which complements and mechanically interacts with the weld-interfacing retaining tabs.

These and other features of the invention will become apparent upon a further reading of the specification.

BRIEF DESCRIPTION OF THE DRAWINGS

FIG. 1 is an exploded view of a two piece prior art valve assembly with a non-supportive, non-retaining relationship between the lower portion and the fuel tank opening;

FIG. 2 is a front perspective view of the prior art valve assembly of FIG. 1, assembled, inserted in a fuel tank opening, and welded in place;

DETAILED DESCRIPTION OF THE ILLUSTRATED EMBODIMENT

Figure 3:
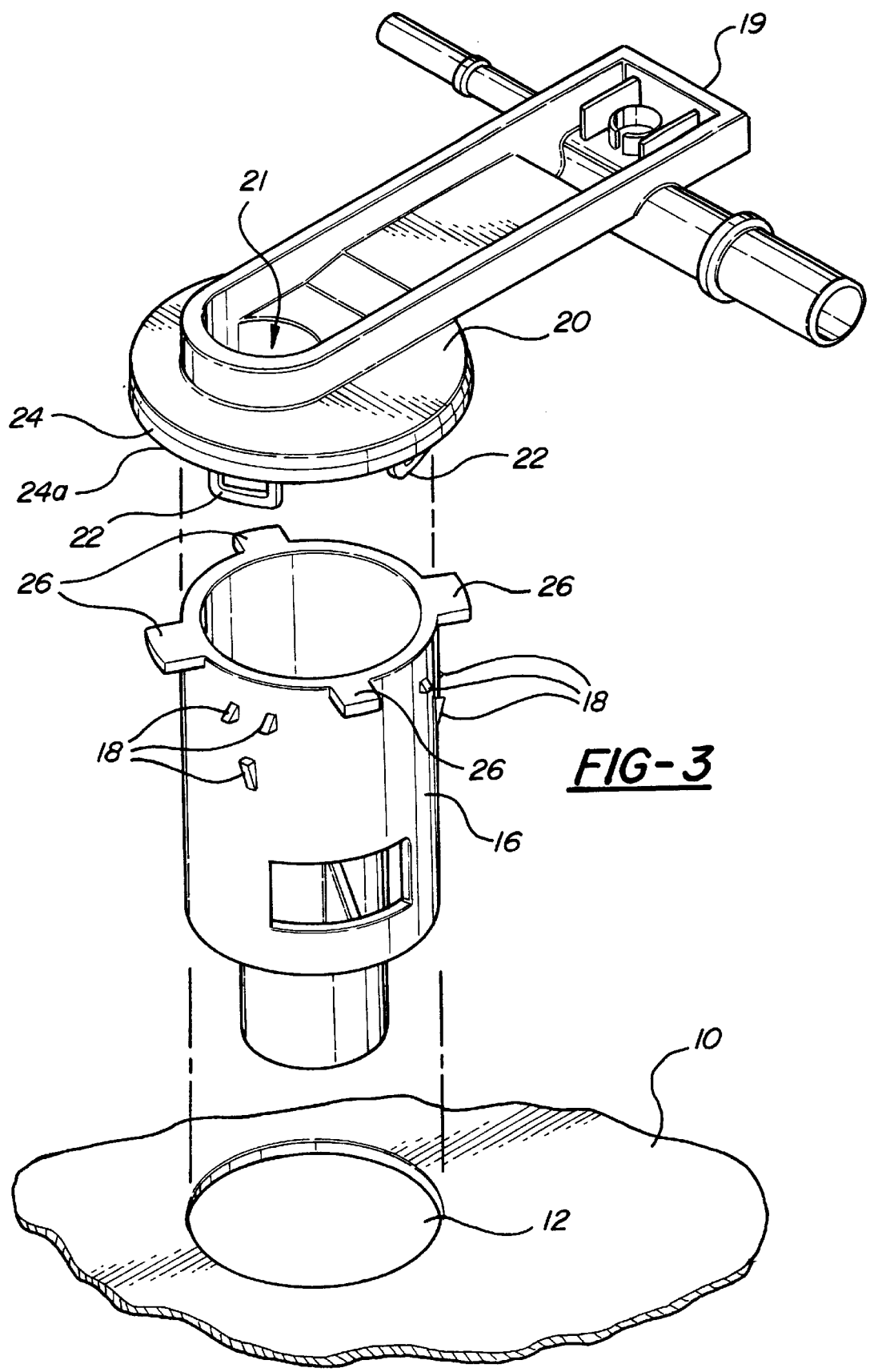
FIG. 3 is an exploded view of a two piece weldable valve assembly according to the present invention prior to being inserted in a fuel tank opening.
Figure 4:
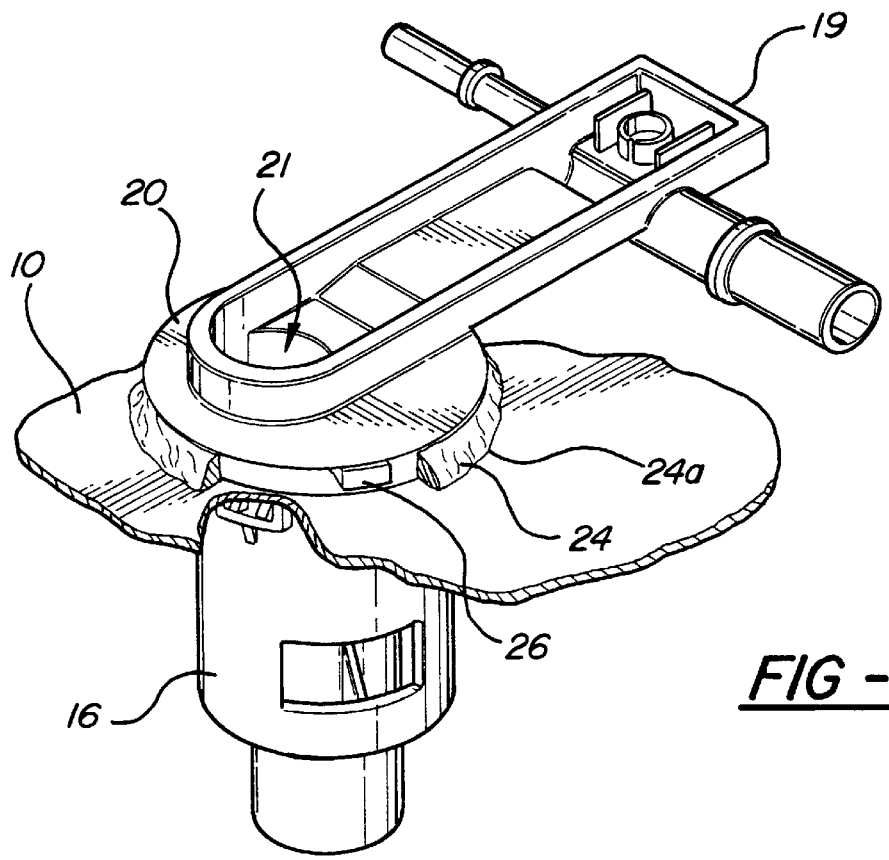
FIG. 4 is a front perspective view of the valve assembly of FIG. 3, assembled and welded in place on the fuel tank; and, FIG. 5 is a bottom (viewed from inside the fuel tank) plan view of the valve of FIG. 4 in its assembled condition.

Referring now to FIGS. 1 and 2, a prior art two piece valve assembly 14 is shown in its unassembled and assembled/mounted conditions relative to a fuel tank wall 10 with a valve-receiving fuel tank opening 12. Valve assembly 14 comprises a lower valve body 16 made from a non-weldable plastic material such as nylon, for example, and an upper valve body portion or cover 20 made from a weldable polymer such as polyethylene, for example, which can be welded in known fashion to the similarly-weldable polymer material of fuel tank wall 10. Upper and lower valve body portions 16, 20 are mechanically assembled prior to insertion in the fuel tank, for example via conventional lock tabs 18 formed on the outer sidewall of the lower valve body, and lock fingers 22 extending from upper valve body portion 20 which slide over and snap onto lock tabs 18. Upper valve body portion 20 is illustrated with a laterally extending outlet portion 19 showing some representative internal detail of outlet and other connections which would normally be covered with a cover; these details, however, are not critical to the invention.

Once the lower and upper valve body portions 16, 20 are connected, assembled valve 14 is mounted on the fuel tank by inserting the lower valve body portion 16 through fuel tank opening 12 until upper valve body portion 20 rests on the upper surface of fuel tank wall 10. As illustrated, lower valve body portion 16 is sized to fit through fuel tank opening 12 without interference; if let go it would simply drop into the tank. Upper valve body portion 20, on the other hand, has a greater diameter so that it acts as a stop for its pre-assembled lower valve body portion 16. Once valve assembly 14 has been located in fuel tank opening 12 by upper valve body portion 20, it is welded to the similarly-weldable fuel tank wall 10 to secure the valve to the fuel tank. Typically, the periphery of upper valve body portion 20 is provided with a circumferential weld foot 24 comprising a downwardly-turned bead or flange of weldable material lying radially outward of the fuel tank opening 12. The welding process is applied to weld foot 24, which melts into the fuel tank wall.

A disadvantage of the prior art valve assembly of the type illustrated in FIGS. 1 and 2 is the need for a pre-assembly of the upper and lower valve body portions prior to being mounted on the fuel tank to retain the lower valve body portion in place relative to the opening 12. Another disadvantage is the deterioration of the mechanical interlock and sealing fit between the upper and lower valve body portions due to different rates of thermal expansion and creep in the high temperature, hydrocarbon-saturated environment of the fuel tank.

It will be apparent to those skilled in the art that valve assembly 14 can comprise any of a number of different vapor venting valves, for example onboard refueling and vapor recovery (ORVR) control valves, rollover valves, running loss valves and the like. The particular valve structure, typically located in the hollow lower valve body portion 16, is unimportant to the present invention. Often, however, the junction of the upper valve body portion 20 and lower valve body portion 16 will define, at least in part, some sort of valve seat (FIG. 5) or vapor outlet (illustrated at 21) selectively opened and closed by a valve element which is pressure-, liquid- or gravity-responsive. Accordingly, not only the mechanical interlock but also the effectiveness of vapor control across the valve seat or vent outlet can be affected by thermal expansion and creep problems between the dissimilar materials of the upper and lower valve body portions.

Referring now to FIG. 3, the present invention is disclosed as applied to the valve configuration illustrated in FIGS. 1 and 2. Accordingly, the same reference numerals will be used where the valve structure of FIGS. 1 and 2 is repeated.

In the inventive valve assembly of FIGS. 3–6, the non-weldable lower portion 16 has been modified with a plurality of support/retaining tabs 26 projecting laterally from the upper end of lower portion 16 to extend beyond the fuel tank opening 12 and rest on the upper surface of fuel tank wall 10 when the lower portion 16 is inserted in the tank. In the illustrated embodiment four evenly-spaced tabs 26 are illustrated, although varying numbers can be used depending on mounting requirements or to accommodate a different number of locking fingers and lock tabs 22, 18. In the illustrated embodiment support/retention tabs 26 are sized to fit snugly between lock fingers 22 when the upper and lower valve body portions are assembled so that they are guided and rotationally secured between fingers 22.

Support/retention tabs 26 will rest on the upper surface of fuel tank wall 10 if the lower valve body portion 16 is inserted alone through fuel tank opening 12. This is beneficial in applications where it is desired to assemble the upper and lower valve body portions after the lower valve body portion has been positioned in the fuel tank opening. When the illustrated embodiment of FIGS. 3–6 is assembled with lock tabs 18 and lock fingers 22, support/retention tabs 26 are inset (FIGS. 4 and 5) into the interior of the weld foot circumference of upper valve body portion 20, and are preferably flush with the upper inside surface of upper valve body portion 20.

Tabs 26 are preferably of a thickness less than the height of weld foot 24. During welding the weld foot 24 melts into the tank wall, effectively lowering the height of weld foot 24 and bringing support/retention tabs 26 into contact with the upper surface of the fuel tank wall 10 as the weld foot melts to sandwich the tabs 26 securely between the upper valve body portion 20 and the surface of fuel tank wall 10.

Figure 5:
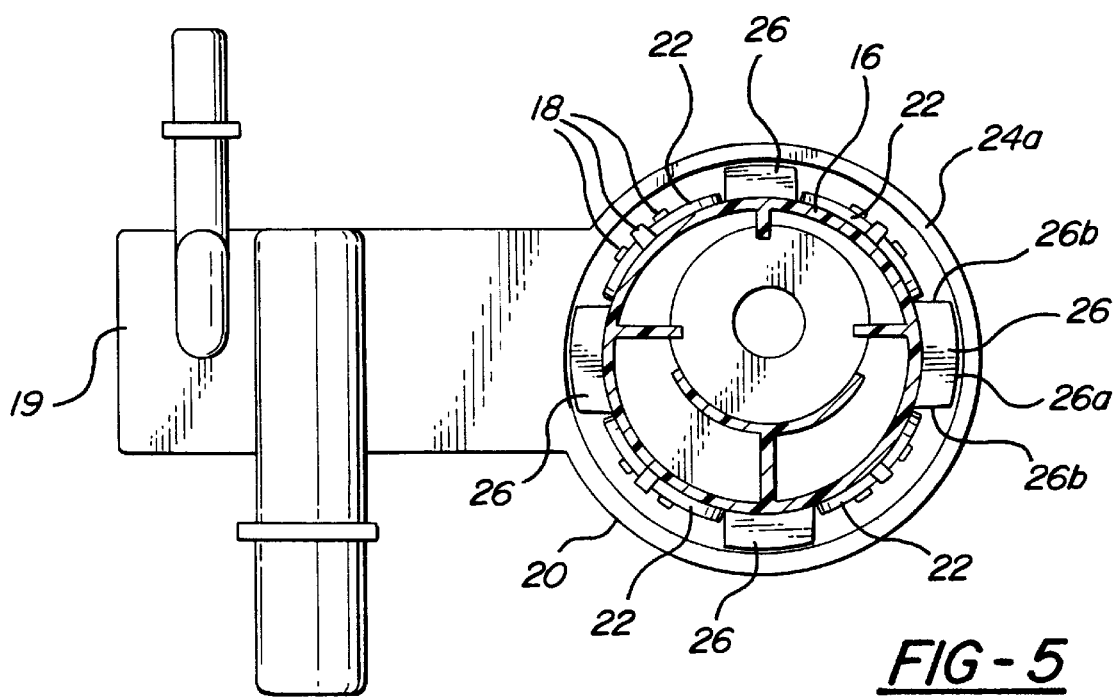

The use of a plurality of circumferentially-spaced tabs 26 cooperating with lock fingers 22 ensures that each tab is individually locked by the melting weld foot on up to three sides (end 26a, sides 26b). Support/retention tabs 26, with their close fit between lock fingers 22, further serve to align lock tabs 18 on lower valve body portion 16 with lock fingers 22 in a positive fashion upon assembly, whether assembly occurs before or after lower valve body portion 16 is inserted into the tank. This is best illustrated in FIG. 5.

It will be understood by those skilled in the art that the foregoing illustrated embodiment is exemplary of the invention, and that various changes and modifications can be made without departing from the scope of the invention.

I accordingly claim:

1. A method for securing an automotive fuel tank valve to the upper surface of a fuel tank, the fuel tank valve being of the type having a valve body inserted through an opening in the fuel tank, and a separately formed weldable cover connected to the valve body and adapted to be welded to the surface of the fuel tank around the opening, the method comprising the following steps:

providing retaining means on the valve body for resting on the upper surface of the fuel tank when the valve body is inserted through the opening in the fuel tank;

mating the cover to the valve body with the retaining means located in a weld-engaging position relative to a weldable portion of the cover; and, welding the weldable portion of the cover to the upper surface of the fuel tank such that the retaining means is secured in contact with the surface of the fuel tank.

2. The method of claim 1, wherein the valve body is inserted through the opening in the fuel tank before the cover is mated with the valve body.

3. The method of claim 2, wherein the valve body and the cover are provided with mechanical interlock structure, and the step of mating the cover to the valve body includes mating the mechanical interlock structure on the cover and valve body.

4. The method of claim 1, wherein the valve body and the cover are mated prior to inserting the valve body through the opening in the fuel tank.

5. The method of claim 4, wherein the valve body and the cover include mating mechanical interlock structure, and the step of mating the cover to the valve body prior to inserting the valve body through the opening in the fuel tank includes mating the mechanical interlock structure.

6. A retaining structure for an automotive fuel tank valve of the type having a valve body inserted through an opening in the fuel tank, and a separately formed weldable cover connected to the valve body and welded to the surface of the fuel tank around the opening, comprising:

retaining means on the valve body for resting on the upper surface of the fuel tank, the retaining means being located relative to a weldable portion of the cover when the cover and valve body are connected such that the welding operation which welds the weldable portion of the cover to the fuel tank also secures the retaining means in contact with the surface of the fuel tank.

7. The apparatus of claim 1, wherein the retaining means of the valve body comprises a plurality of circumferentially-spaced, laterally projecting retaining tabs extending from an upper end of the valve body to rest on the upper surface of the fuel tank around the fuel tank opening and within the periphery of the weldable portion of the cover.

8. The apparatus of claim 7, wherein the valve body further includes mechanical interlock structure for engaging mechanical interlock structure on the cover, the mechanical interlock structure on the cover being positioned to mechanically mate with the retaining means such that the mechanical interlock structure on the cover is properly aligned with the mechanical interlock structure on the valve body.

9. The apparatus of claim 8, wherein the mechanical interlock structure on the cover comprises a plurality of lock fingers having a width approximating the circumferential spacing between the retaining tabs, such that the lock fingers fit closely between the retaining tabs to rotationally align the lock fingers with the mechanical interlock structure on the valve body.

10. The apparatus of claim 7, wherein the retaining tabs are located relative to the weldable portion of the cover such that each retaining tab is individually secured by a melted portion of the weldable portion of the cover when the weldable portion is welded to the fuel tank.

11. The apparatus of claim 10, wherein the retaining tabs are located such that the melted portion of the weldable portion of the cover engages side edges of the retaining tabs in the circumferential spacing between adjacent retaining tabs.

12. The apparatus of claim 7, wherein the weldable portion of the cover comprises a circumferential weld foot having a height, and the retaining tabs have a thickness less than the height of the weld foot.

13. The apparatus of claim 7, wherein the retaining tabs are sandwiched between and in direct contact with an upper inside surface of the weldable cover and the surface of the fuel tank when the weldable portion of the cover is welded to the fuel tank.

14. The apparatus of claim 6, wherein the retaining means comprises means for retaining the valve body in an operative position in the opening in the fuel tank by resting on the upper surface of the fuel tank independently of any connection to the weldable cover.

15. The apparatus of claim 6, wherein the retaining means is an integral part of the valve body, and comprises a non-weldable material that remains unaffected by the welding operation.

* * * * *

UNITED STATES PATENT AND TRADEMARK OFFICE
CERTIFICATE OF CORRECTION

PATENT NO. : 5,954,091  
DATED : September 21, 1999  
INVENTOR(S) : Leadford

Page 1 of 1

It is certified that error appears in the above-identified patent and that said Letters Patent is hereby corrected as shown below:

<u>Column 5,</u>
Line 4, delete the number "1" and insert -- 6 --.

Signed and Sealed this

Fourth Day of December, 2001

*Attest:*

NICHOLAS P. GODICI  
*Attesting Officer*    Acting Director of the United States Patent and Trademark Office